United States Patent [19]

Kaji et al.

[11] Patent Number: 4,778,736
[45] Date of Patent: * Oct. 18, 1988

[54] ELECTRODE SUBSTRATE PROVIDED WITH MANIFOLD, FOR A FUEL CELL AND PROCESS FOR PRODUCING THE SAME

[75] Inventors: Hisatsugu Kaji, Iwaki; Kuniyuki Saitoh, Abiko, both of Japan

[73] Assignee: Kureha Kagaku Kogyo Kabushiki Kaisha, Tokyo, Japan

[*] Notice: The portion of the term of this patent subsequent to May 10, 2005 has been disclaimed.

[21] Appl. No.: 910,065

[22] Filed: Sep. 22, 1986

[30] Foreign Application Priority Data

Oct. 4, 1985 [JP] Japan .................. 60-221438

[51] Int. Cl.$^4$ .......................................... H01M 4/96
[52] U.S. Cl. .................................. 429/38; 429/39; 429/40
[58] Field of Search ...................... 429/38, 39, 40

[56] References Cited

U.S. PATENT DOCUMENTS

| | | |
|---|---|---|
| 3,188,242 | 6/1965 | Kordesch et al. ............... 429/36 |
| 3,998,689 | 12/1976 | Kitago et al. ................... 162/136 |
| 4,506,028 | 3/1985 | Fukuda et al. .................. 429/40 |
| 4,508,337 | 4/1986 | Shigeta et al. .................. 429/34 |
| 4,522,895 | 6/1985 | Shigeta et al. .................. 429/44 |

FOREIGN PATENT DOCUMENTS 2169273 7/1986 United Kingdom .

*Primary Examiner*—John F. Niebling
*Assistant Examiner*—Steven P. Marquis
*Attorney, Agent, or Firm*—Nixon & Vanderhye

[57] ABSTRACT

Disclosed herein is an electrode substrate provided with a manifold, for a fuel cell, comprising (1) the two porous and carbonaceous electrodes respectively provided with the flow channels of a reactant gas and joined to both surfaces of a separator via a flexible graphite sheet, (2) the separator which has been extended beyond the electrode and (3) the manifold which comprises a gas-impermeable and compact carbon plate and is provided with the flow passage for supplying the reactant gas and joined to the thus extended part of the separator via a flexible graphite sheet and the whole composite materials have been formed into one body as carbon, and a process for producing the electrode substrate.

2 Claims, 2 Drawing Sheets

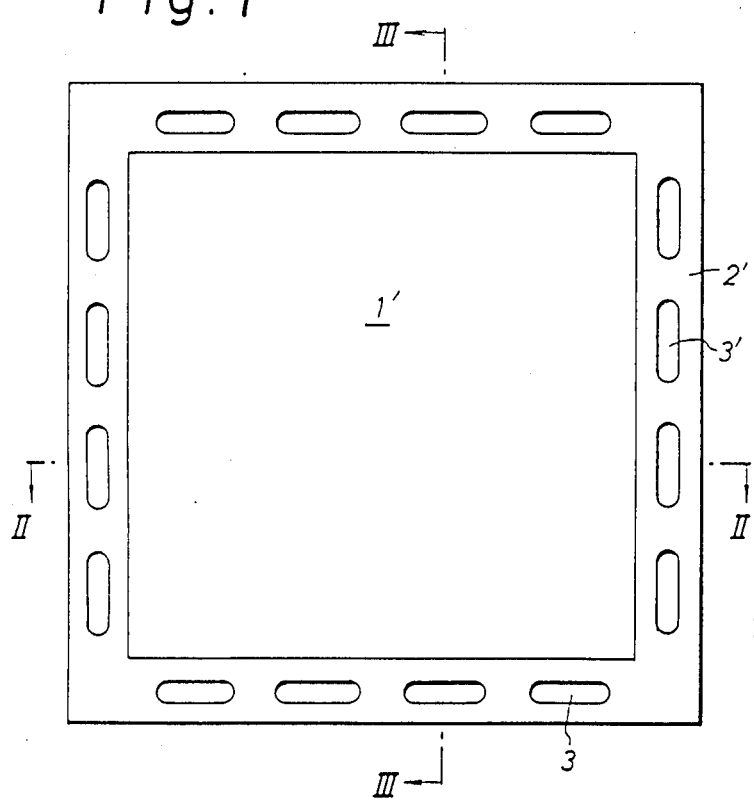
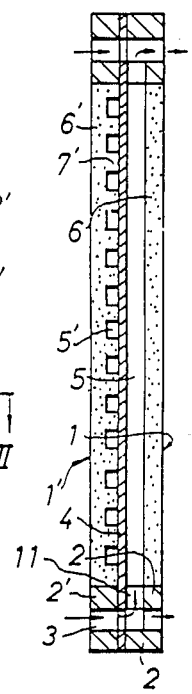
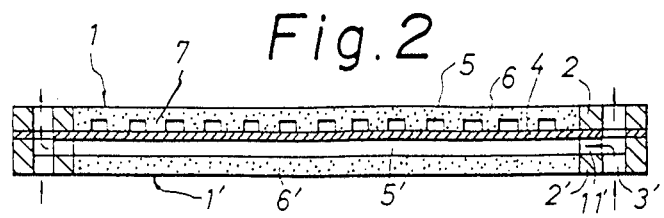

ELECTRODE SUBSTRATE PROVIDED WITH MANIFOLD, FOR A FUEL CELL AND PROCESS FOR PRODUCING THE SAME

BACKGROUND OF THE INVENTION

The present invention relates to an electrode substrate, for a fuel cell of the phosphoric acid type and a process for producing the same, and more in detail, relates to an electrode substrate provided with the manifold, for the fuel cell, comprising (1) the two porous and carbonaceous electrodes respectively provided with the flow channels of the reactant gas and joined to both surfaces of the separator via a flexible graphite sheet, (2) the separator which has been extended beyond the electrode and (3) the manifold which comprises a gas-impermeable and compact carbon plate and is provided with the flow passage for supplying the reactant gas and joined to the thus extended part of the separator via the flexible graphite sheet and the above-mentioned whole composite materials have been formed into one body as carbon, and a process for producing the electrode substrate.

Generally, the substrate as an electrode in a fuel cell of the phosphoric acid type is stacked so that one of the surfaces of the substrate is contacted to the matrix of phosphoric acid and the another surface of the substrate is contacted to the separator.

In addition, in order to form a fuel cell by stacking the electrode substrates, the manifold is disposed on the peripheral (edge) part of the electrode substrate for supplying the reactant gas to the fuel cell to prevent the diffusion of the reactant gas from the side of the electrode substrate to outside at the same time.

Hitherto, in such a fuel cell, the joining of the composite materials thereof to each other has been carried out by using a carbon cement. However, since the carbon cement is eroded by phosphoric acid, there have been the possibilities of causing exfoliation of the composite materials and occurrence of leakage of the reactant gas through the joining part.

Further, there has been a problem from the view point of the mechanical strength of the material that there are occasions of the breaking of such an electrode substrate in handling in the case where the surface area thereof is too large, because an electrode is generally in a thin plate-form.

As a result of the present inventors' studies on the processes for producing the electrode substrate provided with the manifold, for a fuel cell, which does not have the above-mentioned defects, it has been found by the present inventors that the electrode substrate provided with the manifold, for a fuel cell, wherein all the composite materials thereof have been joined by carbon and further calcined to be one body, is particularly excellent in resistance to phosphoric acid, and that since a peripheral part serving also as the gas manifold (hereinafter referred to as the "manifold") has been joined to the peripheral part of the substrate as one body, there is a reinforcing effect thereby and that such an electrode has an excellent handling property. On the basis of their above-mentioned findings, the present inventors have attained the present invention.

Namely, the first object of the present invention is to provide an electrode substrate provided with a manifold, for a fuel cell, wherein the manifold provided with a flow passage for supplying the reactant gas has been formed into one body together with the electrode substrate part as carbon.

The second object of the present invention is provide to an electrode substrate for a fuel cell of the phosphoric acid type, which is excellent in resistance to phosphoric acid.

Other objects and the merits of the present invention will be clear to the persons skilled in the art from the following description.

SUMMARY OF THE INVENTION

In a first aspect of the present invention, there is provided an electrode substrate provided with a manifold, for a fuel cell, comprising (1) two porous and carbonaceous electrodes respectively provided with flow channels of the reactant gas and joined to both surfaces of a separator via a flexible graphite sheet, (2) the separator which has been extended beyond the electrode and (3) manifold which comprises a gas-impermeable and compact carbon plate and is provided with a flow passage for supplying the reactant gas and joined to the extended part of the separator via the flexible graphite sheet, the whole composite materials being formed into one body as carbon.

In a second aspect of the present invention, there is provided a process for producing an electrode substrate provided with a manifold, for a fuel cell, which process comprises:

(1) joining two flexible graphite sheets to both surfaces of a separator material by an adhesive,
(2) applying the adhesive on each of the joining surfaces of two porous and carbonaceous electrode materials which are smaller in a surface area than the separator and have been provided with flow channels of the reactant gas, the flexible graphite sheets and a manifold material comprising a gas-impermeable and compact carbon plate,
(3) joining two electrode materials to the both surfaces of the separator material via the flexible graphite sheet and joining the manifold material to the extended part of the separator material beyond the electrode material via the flexible graphite sheet,
(4) calcining the whole composite materials thus joined to each other under a reduced pressure and/or in an inert atmosphere and further
(5) making hole(s), which becomes a flow passage for supplying the reactant gas, at an optional stage of this process.

BRIEF EXPLANATION OF THE DRAWINGS

Of the attached drawings,

FIG. 1 is a ground plan of the electrode substrate according to the present invention;

FIGS. 2 and 3 are respectively the cross-sections of II—II and III—III of FIG. 1, FIGS. 4a through 4d show partial plan views of the manifolds according to the present invention.

DETAILED DESCRIPTION OF THE INVENTION

Figure 5A:
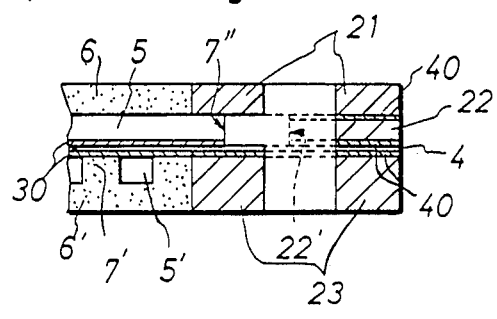
FIGS. 5a through 5d show cross sectional elevational views of the manifolds shown in FIGS. 4a through 4d as taken along lines 5a—5a through 5d—5d therein, respectively.

The present invention relates to an electrode substrate provided with the manifold, for a fuel cell, wherein the two porous and carbonaceous electrodes respectively provided the flow channels of the reactant gas has been joined to the both surfaces of the separator via a flexible graphite sheet; the separator has been extended beyond the electrode; the manifold which comprises a gas-impermeable and compact carbon plate has been provided with the flow passage for supplying the reactant gas and joined to the thus extended part of the separator via the flexible graphite sheet and the thus obtained whole composite materials have been formed into one body as carbon, and a process for producing the above-mentioned electrode substrate.

The electrode substrate according to the present invention will be explained more in detail while referring to the attached drawings as follows:

Of the attached drawings, FIG. 1 is the ground plan of the electrode substrate according to the present invention and FIGS. 2 and 3 are respectively the cross-sectional views along II—II and III—III in FIG. 1.

The electrode substrate according to the present invention has a construction comprising the two electrodes 1, 1' having the flow channels 5, 5' of the reactant gas, the separator 4 interposed between the two electrodes and the manifolds 2, 2' adjacent to the periphery of the electrodes, the joining parts of each of the materials having been joined via a flexible graphite sheet. Moreover, the flow passage 3 for supplying the reactant gas is disposed in the manifold 2 while penetrating the manifold 2 and also the separator 4.

The flow passage 3 for supplying the reactant gas is (1) connected to the flow channel 5 of the reactant gas provided in the electrode 1 comprising the gas diffusion part 6 and rib 7, via a flow passage 11 of the reactant gas provided in the manifold 2 or (2) connected directly to the flow channel 5 of the reactant gas provided in the electrode 1, and another electrode 1' is sealed by the manifold 2' (refer to FIG. 3).

In FIG. 2, the flow passage 3' for supplying the reactant gas is (1) connected to the flow channel 5' of the reactant gas provided in the electrode 1' via a flow passage 11' of the reactant gas provided in the manifold 2' or (2) connected directly to the flow channel 5' of the reactant gas provided in the electrode 1', and the another electrode 1 is sealed by the manifold 2.

The flow channel 5 of the reactant gas is prescribed by the gas-diffusion part 6 in the electrode 1, the rib 7 and the separator 4 or the flexible graphite sheet (refer to 30 in FIG. 4) joined to the separator 4.

The electrode comprises a porous and carbonaceous material and it is preferable that the electrode has a mean bulk density of 0.3 to 0.9 g/cc, a gas-permeability of not less than 200 ml/cm$^2$·hour·mmAq and an electric resistivity of not more than 200 mΩ·cm after having been calcined at a temperature of not lower than 1000° C. under a reduced pressure and/or in an inert atmosphere.

Concerning the separator, it is preferable that the separator has a mean bulk density of not less than 1.40 g/cc, a gas-permeability of not more than $10^{-6}$ ml/cm$^2$·hour·mmAq, an electric resistivity of not more than 10 mΩ·cm and a thickness of not more than 2 mm.

There are various modes concerning the internal structure of the manifold, and some examples thereof are shown in FIGS. 4a through 4d and FIGS. 5a throgh 5d. The left figures in FIGS. 4a through 4d and FIGS. 5a through 5d are the partial cross sections of the manifold and the right figures in FIGS. 4a through 4d and FIGS. 5a through 5d are the partial ground plans of the manifold, respectively.

Figure 4A:
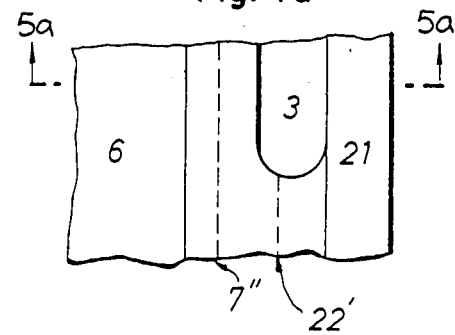

As shown in FIGS. 4a and 5a, the manifold has a construction of being divided into three parts 21, 22 and 23, and the rib 7 of one of the electrodes has a construction of entering a little under the manifold part 21 (for instance to the position 7"). The internal edge of the manifold part 22 is shown by 22'. The two parts 21 and 22 of the manifold, 22 and 23 and the separator 4 and 23 and the separator 4 are mutually joined via the flexible graphite sheet as shown by 40 in FIGS. 4a and 5a, respectively.

Figure 5B:
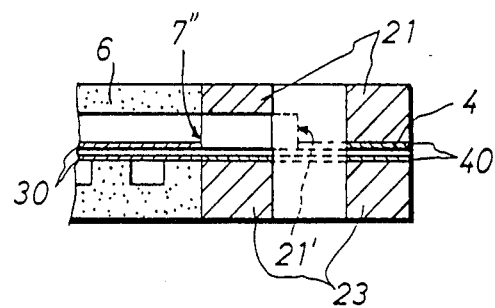
Figure 4B:
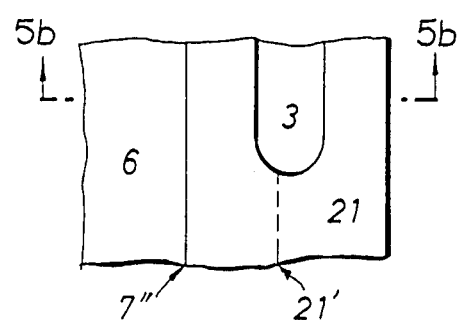
Figure 5C:
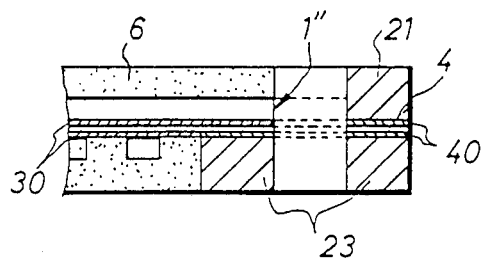
Figure 4C:
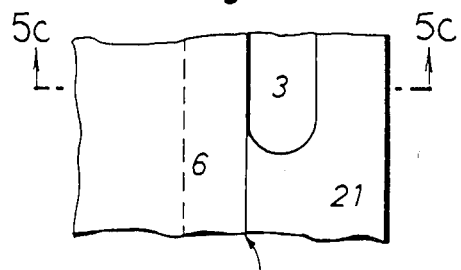
Figure 5D:
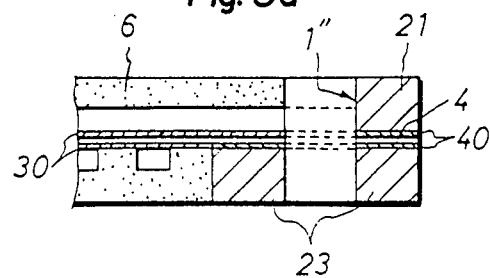
Figure 4D:
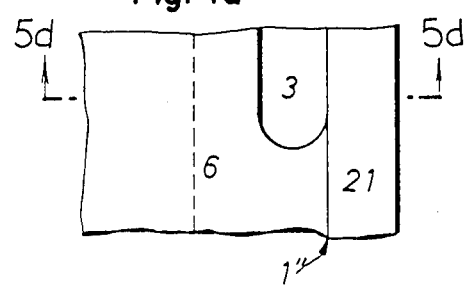

In FIGS. 4b and 5b, the manifold parts 21 and 22 in FIGS. 4a and 5a above has been formed into one body and the manifold consists of the two parts 21 and 23. The rib 7 ends in the same plane 7" as the edge surface of the gas-diffusion part 6. In addition, the surface corresponding to the inner edge 22' of FIGS. 4a and 5a is shown in FIGS. 4b and 5b by numeral 21'.

In FIGS. 4c–4d and 5c–5d, a structure is shown wherein one of the electrodes joined to the separator has been extended to either end of the flow passage 3 for supplying the reactant gas (the end being shown by 1") and contacts the inner edge of the manifold part 21.

In every one of the above-mentioned cases, the flexible graphite sheet has been interposed between the above-mentioned materials except for between the electrode and the manifold, and the whole composite materials have been formed into one body.

In addition, the structures shown in FIGS. 4a–4d and 5a–5d indicate only a few examples of the internal structure of the manifold, and various modes of the internal structure of the manifold different from those show above can be taken according to the object.

It is preferable that the above-mentioned manifold has a mean bulk density of not less than 1.40 g/cc and a gas-permeability of not more than $10^{-4}$ ml/cm$^2$·hour·mmAq.

As has been described above, in the electrode substrate for a fuel cell according to the present invention, although the whole composite materials have been joined together via the flexible graphite sheet, the amount of gas-leakage through the manifold including the joining parts is preferably not more than $10^{-2}$ ml/cm$^2$·hour·mmAq, in the case where the leakage is represented as the amount of gas-leakage per the length of the periphery of the joining part under a definite differential pressure per unit time, namely, by the relationship of [amount of gas-leakage/(length of the side)·(differential pressure)].

In order to produce the electrode substrate provided with the manifold for a fuel cell according to the present invention, the electrode materials, the separator material and the manifold material are joined together while interposing the flexible graphite sheet between the composite materials via an adhesive and the whole composite materials thus joined are calcined under a reduced pressure and/or in an inert atmosphere.

In addition, the hole 3 which becomes the flow passage for supplying the reactant gas of the manifold may be made in any optional stage in the process for producing the electrode substrate according to the present invention, for instance, the hole 3 may be made before or after joining the manifold material to the electrode material and to the separator material. Of course, it is preferable to suitably make a flow passage 11 connecting this hole 3 to the flow channel 5 of the electrode material before joining the manifold material.

The desirable process for producing the electrode substrate provided with the manifold, for a fuel cell according to the present invention will be explained as follows.

In the first place, two porous and carbonaceous electrode materials provided with the flow channels of the reactant gas and the separator material which is larger in a surface area than the electrode material are joined together while interposing the flexible graphite sheet between each of the electrode materials and the separator material so that the separator material is extended beyond the electrode material, by using an adhesive.

As the electrode material for the electrode substrate according to the present invention, the following materials may be used:

(1) a material obtained by thermally molding a mixture of short carbon fibers, a binder and an organic granuler substance under a pressure (for instance, refer to Japanese Patent Application Laid-Open No. 59-68170 (1984)), and particularly, the material obtained by thermally molding the mixture comprising 20 to 60% by weight of short carbon fibers of not more than 2 mm in length, 20 to 50% by weight of a phenol resin and 20 to 50% by weight of an organic granular substance (a micro-pore regulator) under the conditions of a molding temperature of 100° to 180° C., a molding pressure of 2 to 100 kgf/cm$^2$G and a pressure holding time of 1 to 60 min, (2) a material obtained by calcining the molded material of the above (1) at a temperature of not lower than 1000° C. under a reduced pressure and/or in an inert atmosphere, (3) a molded material comprising (a) the gas-diffusing part consisting of the resin-impregnated paper sheets prepared by impregnating a paper sheets obtained from a mixture of carbon fibers of not more than 20 mm in length, at least one kind of organic fibers selected from pulp, regenerated cellulose fibers and polyacrylonitrile fibers, etc. and a binder for paper-making by paper-manufacturing method, with a solution of a phenol resin (for instance, refer to Japanese Patent Publication No. 53-18603 (1978)) and (b) the rib prepared by molding the raw material shown in (1) and (4) a material obtained by calcining the molded material shown in the above (3) at a temperature of not lower than 1000° C. under a reduced pressure and/or in an inert atmosphere.

As the separator material used according to the present invention, a compact carbon plate showing a calcining shrinkage of not more than 0.2% in the case when the material is calcined at 2000° C. under a reduced pressure and/or in an inert atmosphere is preferable.

The flexible graphite sheet used according to the present invention is preferably the product prepared by compressing the expanded particles obtained by, for instance, subjecting graphite particles of not more than 5 mm in diameter to acid-treatment and further heating the thus acid-treated graphite particles, and it is preferable that the graphite sheet has a thickness of not more than 1 mm, a bulk density of 1.0 to 1.5 g/cc, a rate of compression strain (namely, the rate of strain under the compression load of 1 kgf/cm$^2$) of not more than $0.35 \times 10^{-2}$ cm$^2$/kgf and a flexibility of not being broken when being bent to the radius of curvature of 20 mm. Of the commercialized flexible graphite sheets, GRAFOIL® (made by U.C.C.) is the suitable example.

In the next place, the manifold material is joined to the extended part of the thus obtained separator material which has been extended beyond the electrode of the electrode substrate while interposing the flexible graphite sheet between the manifold material and the separator material, by an adhesive.

As the manifold material, a compact carbon material showing a calcining shrinkage of not more than 0.2% when the material is calcined at 2000° C. under a reduced pressure and/or in an inert atmosphere is preferable.

As the adhesive applied on the each joining surface at the time when the above-mentioned electrode materials, separator material and manifold material are joined together via the flexible graphite sheet, any adhesive generally used for joining the ordinary carbon materials may be used, however, particularly it is preferable to use a thermosetting resin selected from phenol resins, epoxy resins and furan resins for that purpose.

Although the thickness of the layer of the adhesive is not particularly restricted, it is preferable to apply the adhesive uniformly in the thickness of generally not more than 0.5 mm thereon.

Furthermore, the junction by the above-mentioned adhesive can be carried out under the conditions of a temperature of 100° to 180° C., a joining pressure of 1.5 to 50 kgf/cm$^2$G and a pressure holding time of 1 to 120 min.

Thereafter, the thus obtained, composite materials are after-hardened by heating at the press-temperature for at least 2 hours and then calcined at a temperature of 800° to 3000° C. for about one hour under a reduced pressure and/or in an inert atmosphere.

Since the manifold of the electrode substrate provided with the manifold for a fuel cell according to the present invention has been joined to the substrate in one body, the supply and the discharge of the necessary gas is made possible as a whole fuel cell through the each manifold sections of the stacked fuel cell when the reactant gas is simply introduced into the manifold, and accordingly, it is not necessary, of course, to provide an outer manifold for supply and discharge of the reactant gas, etc. which is regarded necessary in a conventional fuel cell, and at the same time, such a construction has the following effect.

Namely, the whole materials of the electrode substrate according to the present invention have been formed into one body as carbon, and accordingly the electrode substrate according to the present invention is excellent in the resistance to phosphoric acid and is particularly useful as an electrode substrate for a fuel cell of phosphoric acid type.

Furtheremore, since the manifold has been uniformly disposed and joined around the electrode substrate of thin plate-form, there is a reinforcing effect due to such a construction, and as a result, the electrode substrate according to the present invention is excellent in handling property at the time of producing the fuel cell.

The present invention will be explained more in detail while referring to the non-limitative example as follows.

EXAMPLE (1) Electrode material

After mixing 35% by weight of short carbon fibers (made by KUREHA KAGAKU KOGYO Co., Ltd. under the trade name of M-204S, of 14 μm in the mean diameter and 400 μm in the mean length), 30% by weight of a phenol resin (made by ASAHI YUKIZAI Co., Ltd. under the trade name of RM-210) and 35% by weight of particles of polyvinyl alcohol (made by NIHON GOSEI KAGAKU KOGYO Co., Ltd. of 180

μm in the mean diameter), the mixture was supplied into a predetermined metal mold and molded under the conditions of the molding temperature of 135° C., the molding pressure of 35 kgf/cm²G and the pressure holding time of 20 min to produce a ribbed electrode material of 600 mm in length, 600 mm in width and 1.5 mm in thickness. The thickness of the rib and the thickness of the gas-diffusion part thereof were 1.0 mm and 0.5 mm, respectively.

(2) Separator material

A compact carbon plate (made by SHOWA DENKO Co., Ltd. of the thickness of 0.8 mm) was cut into a piece of 20 mm in width and length, respectively, and the thus obtained piece of the compact carbon plate was used as the separator material.

(3) Manifold material

From a compact carbon plate (made by TOKAI Carbon Co., Ltd. of the bulk density of 1.85 g/cc and of the thickness of 1.63 mm), two pieces of 60 mm in width and 720 mm in length and two pieces of 60 mm in width and 600 mm in length were obtained by cutting, and the each parts in the thus obtained four pieces of the plates corresponding to the each flow passages for supplying the reactant gas were cut to provide the flow passages (holes) for supplying the reactant gas therein. Then, a pair of the plates in the four pieces of the obtained plates with the holes were respectively provided with flow passages of the reactant gas for connecting the flow passage for supplying the reactant gas in the manifold to the flow channels of the reactant gas in the electrode, by cutting the parts corresponding thereto. Thus, the four pieces of manifold materials for joining to one surface of the separator were obtained. Also, by using the above-mentioned method and the same material in quality and size as the above-mentioned manifold materials, the four pieces of manifold materials for joining to the another surface of the separator were obtained.

(4) Flexible graphite sheet

A GRAFOIL ® sheet (made by U.C.C., of the bulk density of 1.10 g/cc and the thickness of 0.13 mm) (hereinafter referred simply to as GRAFOIL ®) was suitably cut into pieces according to the area of the respective joining surfaces and the thus obtained pieces were used as the flexible graphite sheet.

After applying an adhesive of phenol resin series on the both surfaces of the above-mentioned separator material and the one surface of each GRAFOIL ® and drying the thus applied adhesive, the separator and GRAFOIL ® were joined together under the conditions of 135° C. in the joining temperature, 10 kgf/cm²G in the joining pressure and 20 min in the pressure holding time.

In the next step, the adhesive was applied on each of GRAFROIL ® surfaces of the thus joined materials and the thus applied adhesive was dried. In the same manner, the adhesive was applied on the top surface of the rib of the above-mentioned electrode material and on the joining surface of the manifold material to be joined to GRAFOIL ® and the thus applied adhesive was dried.

Thereafter, each of the above-mentioned materials was supplied into a metal mold so that the materials form a predetermined shape (namely, into the shape in which each of the two electrode materials is disposed on each of the both surfaces of the above-mentioned separator and the manifold material is disposed on the extended part of the separator beyond the electrode), the thus introduced materials were joined together at 135° C. under a pressure of 10 kgf/cm²G for 20 min, and the thus joined materials were calcined at 2000° C. for 60 min in an atmosphere of nitrogen gas to obtain the electrode substrate for a fuel cells provided with the manifold and formed into one body as carbon.

What is claimed is:

1. An electrode composite substrate for a fuel cell which is provided with manifolds, each manifold having at least one flow passage for supplying reactant gas, said composite substrate comprising:

(1) a separator having a bulk density of not less than 1.40 g/cc, a gas-permeability of not more than $10^{-6}$ ml/cm².hour.mmAg, an electric resistivity of not more than 10mΩ·cm and a thickness of not more than 2 mm;

(2) a pair of porous carbonaceous electrodes, each said electrode provided with flow channels for a reactant gas, and wherein each of the electrodes is joined to respective opposing surfaces of the separator by means of a flexible graphite sheet such that the periphery of the separator extends beyond the electrodes, and wherein each of the electrodes comprises a gas diffusion part and ribs, the flow channel for the reactant gas, being provided in the electrode and defined by the gas-diffusion part, the ribs and the separator or the flexible graphite sheet; and (3) a pair of manifolds, each said manifold comprising a gas-impermeable compact carbon plate having a bulk density of not less than 1.40 g/cc and a gas permeability of not more than $10^{-4}$ml/cm².hr.mmAg., each of the said manifolds being joined to the extended peripheries on the surfaces of the separator by means of that one of the flexible graphite sheets which joins the respective electrode on that surface to the separator, and wherein the flow passage for supplying the reactant gas penetrates both the manifold and the separator, (4) said separator, electrodes and manifolds being in the form of a unitary carbonized body achieved by calcination under a reduced pressure and/or in an inert atmosphere.

2. An electrode substrate provided with a manifold for a fuel cell according to claim 1, wherein the porous, carbonaceous electrode has a bulk density of 0.3 to 0.9 g/cc, a gas-permeability of not less than 200 ml/cm².hour.mmAq and an electric resistivity of not more than 200 mΩ.cm after calcination at a temperature of at least 1000° C. under a reduced pressure, an inert atmosphere or both.

* * * * *